United States Patent [19]

Rivshin

[11] Patent Number: 5,303,341
[45] Date of Patent: Apr. 12, 1994

[54] VIDEO PROCESSOR FOR A PRINTING APPARATUS

[75] Inventor: Isaak Rivshin, Pittsford, N.Y.

[73] Assignee: Xerox Corporation, Stamford, Conn.

[21] Appl. No.: 784,481

[22] Filed: Oct. 29, 1991

[51] Int. Cl.$^5$ .......................................... G06F 15/20
[52] U.S. Cl. .................... 395/162; 395/101; 358/444
[58] Field of Search ............... 395/101, 109, 115, 162, 395/163, 164, 165, 166; 358/296, 300, 404, 437, 468, 444, 449, 451, 406, 401

[56] References Cited

U.S. PATENT DOCUMENTS

| | | | |
|---|---|---|---|
| 4,169,275 | 9/1979 | Gunning | 358/300 |
| 4,205,350 | 5/1980 | Gunning | 358/296 |
| 4,580,171 | 4/1986 | Arimoto | 358/280 |
| 4,672,186 | 6/1987 | Van Tyne | 235/470 |
| 4,800,431 | 1/1989 | Deering | 358/160 |
| 4,920,427 | 4/1990 | Hirata | 358/437 |
| 4,931,984 | 6/1990 | Ny | 364/900 |
| 4,947,345 | 8/1990 | Paradise et al. | 364/519 |
| 4,987,529 | 1/1991 | Craft et al. | 364/200 |
| 5,016,114 | 5/1991 | Sakata et al. | 358/404 |
| 5,021,892 | 6/1991 | Kita et al. | 358/468 |
| 5,027,221 | 1/1991 | Hisatake et al. | 358/300 |
| 5,038,218 | 8/1991 | Matsumoto | 358/296 |
| 5,129,060 | 7/1992 | Pfeiffer et al. | 395/166 |
| 5,130,809 | 7/1992 | Takayanagi | 358/300 |
| 5,150,462 | 9/1992 | Takeda et al. | 395/166 |
| 5,170,266 | 12/1992 | Marsh et al. | 358/468 |
| 5,175,633 | 12/1992 | Saito et al. | 358/406 |
| 5,223,948 | 6/1993 | Sakurai et al. | 358/404 |

OTHER PUBLICATIONS

Research Disclosure Mar. 1991, 32388 Reproduction Apparatus Providing User Manual and Other Documentation, pp. 201-203.

Primary Examiner—Dale M. Shaw
Assistant Examiner—Kee M. Tung
Attorney, Agent, or Firm—Gary B. Cohen

[57] ABSTRACT

A video processor, for transferring a set of image data from an input device to an output device, is provided. The video processor is intended for use in a printing apparatus having a controller for controlling operation of the input and output devices as well as the video processor, while the video processor has an image bus across which the set of image data can be transmitted. The video processor comprises an integrated adaptive compressor for buffering a preselected number of the bytes, the integrated adaptive compressor communicating with the input device. A memory communicates with the integrated adaptive compressor, the memory being capable of selectively storing the preselected number of bytes. The memory also includes predesignated addresses at which the bytes can be stored, and the controller communicates with the memory. The video processor further comprises a direct memory access arrangement, the direct memory access arrangement communicating with the integrated adaptive compressor and the memory. The direct memory access arrangement is adapted to enable transfer of the preselected number of bytes in the integrated adaptive compressor to the predesignated addresses. Preferably, the controller is capable of transmitting data independent of the integrated adaptive compressor so that data can be transferred between the controller and the memory while image data is being accumulated in the integrated adaptive compressor.

16 Claims, 13 Drawing Sheets

VIDEO PROCESSOR FOR A PRINTING APPARATUS

BACKGROUND OF THE INVENTION

The subject matter of the present case is related to copending patent application Ser. No. 07/784,493, now U.S. Pat. No. 5,261,041 filed Oct. 29, 1991, 1991, entitled "VIDEO PROCESSOR FOR A PRINTING APPARATUS," the pertinent portions of which are incorporated herein by reference, and to copending patent application Ser. No. 07/784,195, now U.S. Pat. No. 5,276,799, filed Oct. 29, 1991, entitled "EXPANDABLE ELECTRONIC SUBSYSTEM FOR A PRINTING APPARATUS," the pertinent portions of which are incorporated herein by reference.

1. Field of the Invention

The present invention relates generally to a printing apparatus, and more particularly to a video processor including an improved data transfer arrangement, which arrangement facilitates multi-function operation of the printing apparatus.

2. Description of the Prior Art

It is now well accepted that electronic reprographic systems, such as Canon's NP-9030 digital copying apparatus, have certain distinct advantages over known light-lens systems. The NP-9030 was one of the first electronic reprographic systems to be marketed with the capability to convert an optical image from a scanned original to image intensity signals, and reconstruct the signals, by way of a print engine using a pulsed diode laser. Because of the many image processing capabilities of the electronic reprographic system, which allows for, among other things, cut and paste operations, these types of systems are gaining immensely in popularity. While the NP-9030 was, when first introduced, a revolutionary product, it can no longer keep pace with advancements in the art, many of which are spurred on by advancements in related art areas, such as facsimile and computer.

Advancements in the area of digital design has had a profound effect on the design of electronic reprographic systems. Indeed, in 1990, Xerox launched an electronic reprographic system, known as Docutech, that should serve as a benchmark in the area of electronic reprographics for many years to come. In systems such as Docutech, documents being scanned by an automatic document scanner, also known as an image input terminal (IIT), are processed by an electronic sub-system (ESS) controller and stored in permanent memory pending printing, editing or later use. The ESS of the Docutech system represents a great advancement in the art; however, the highly advanced ESS of Docutech carries a relatively high price, in terms of design and manufacturing. Consequently, to those users who seek some of the advantages of electronic reprograpics, without the potentially inaccessible price tag of Docutech, there continues to be a demand for a system having a relatively high speed, yet inexpensive ESS.

A relatively inexpensive electronic reprographic machine is disclosed in RESEARCH DISCLOSURE, No. 32388, March, 1991. This machine comprises a scanner communicating with a memory section and a Video Processor (VP) by way of a CPU. In one form of operation image data can be transmitted to addresses configured in the memory by the CPU. Moreover, the image data can be retrieved from memory and processed with the VP.

The following patents, which relate to image data transfer in image processing devices, may be of pertinence to the present disclosure:

U.S. Pat. No. 4,580,171
Patentee: Arimoto
Issued: Apr. 1, 1986
U.S. Pat. No. 4,800,431
Patentee: Deering
Issued: Jan. 24, 1989
U.S. Pat. No. 4,920,427
Patentee: Hirata
Issued: Apr. 24, 1990
U.S. Pat. No. 4,931,984
Patentee: Ny
Issued: Jun. 5, 1990
U.S. Pat. No. 4,987,529
Patentee: Craft et al.
Issued: Jan. 22, 1991
U.S. Pat. No. 5,016,114
Patentee: Sakata et al.
Issued: May 14, 1991
U.S. Pat. No. 5,021,892
Patentee: Kita et al.
Issued: Jun. 4, 1991
U.S. Pat. No. 5,027,221
Patentee: Hisatake et al.
Issued: Jun. 25, 1991
U.S. Pat. No. 5,038,218
Patentee: Matsumoto
Issued: Aug. 6, 1991

U.S. Pat. No. 4,580,171 discloses an image a system in which a reader is coupled with a CPU and an image memory. The memory includes an address counter for sequentially designating addresses to which respective bytes of image data generated by the reader are transferred. As each address is designated by the counter, a memory control signal is transmitted from the CPU to the memory so that the byte can be transferred to or from the memory. An arrangement of a byte counter and a comparator is employed to determine when a preselected number of bytes has been transferred to or from the memory. The preselected number of bytes written into the memory are transferred to a pair of line buffers for subsequent output.

U.S. Pat. No. 4,800,431 discloses a video signal processing device frame buffer controller for storing a frame of an image in its original, intermediate or final form in a frame memory. The frame buffer controller comprises a video input interface, a video output interface, a microprocessor interface and a memory interface. Input data is in an eight bit format, and two successive eight bit chunks are stored in an input buffer so that a sixteen bit format can be transferred to memory through a memory controller. Similarly, in the output interface sixteen bits from the memory are held in a buffer and transmitted to the output eight at a time. This allows the input and output channels to alternate internally while appearing externally to be operating simultaneously. Apparently, data from a system controller, namely a microprocessor, is transferred to the memory controller by way of the input buffer. Hence, it follows that the system controller cannot access the memory controller while image data is being inputted to the input buffer.

U.S. Pat. No. 4,920,427 discloses a facsimile apparatus having multiple bus lines. A first pair of bus lines for carrying image data are coupled with a DMA, a RAM, a disk controller, a data compressor, a data decompressor and a CPU. The CPU is also connected to a third bus, the third bus being connected to a plurality of devices including a working memory (a RAM) for the CPU and a ROM for storing programs used in the CPU. An object of the invention is achieved by inhibiting at least a calling operation during an interval in which a call signal is interrupted so as to prevent "collision" of a receiving operation and the calling operation.

U.S. Pat. No. 4,931,984 discloses a file data retrieving system architecture including: a main bus having a CPU, a memory and a plurality of interfaces connected thereto; an image bus; a pair of data processing units for performing data compression and reproduction, each data processing unit being connected to both the main bus and the image bus; and two display memories, each display memory having data storage capacity corresponding to at least one page of a document of a maximum size, and each display memory being connected to both the main bus and the image bus. The above-described architecture makes it possible to reduce load on the main bus due to a toggle processing of data wherein image data is only transmitted on the image data bus.

U.S. Pat. No. 4,987,529 discloses a bus arbitration control system for a computer system having a microprocessor, a system memory, a memory refresh circuit, a DMA controller, and a plurality of peripheral device bus masters and a shared bus. The arbitration control system gives highest priority to a bus access request signal from the memory refresh circuit. The DMA controller is given second priority access to a shared bus, and the peripheral device bus masters are given next highest priority. The priority rankings of the peripheral device bus masters rotate each time a bus master is granted access to the bus. The microprocessor is given lowest bus access priority except when an interrupt signal must be serviced.

U.S. Pat. No. 5,016,114 discloses a digital copier apparatus with external laser card storage and image compression. In one embodiment of the invention a processor bus is coupled with a main bus and a local bus. An IIT/IOT module, an MPU, a main storage section and an I/O control block are coupled with the processor bus. Additionally, a bit map memory, a compander, a DMAC, a buffer memory and a laser card module are coupled with the main bus. Finally the bit map memory, the compander and the DMAC are also coupled with the local bus. In one example, the buffer memory can be omitted and the compander can be integrated with a FIFO buffer. When the compander and the FIFO are integrated, the buffer memory can be omitted and image data can be fed continuously to the laser card module.

U.S. Pat. No. 5,021,892 discloses an image processing device for controlling data transfer comprising an image scanner, an image printer, a facsimile control unit, a multi-purpose bus, a bidirectional parallel interface unit, and a main CPU. Data can be moved among various input/output units of the device by way of the main CPU. Moreover, the device includes a memory, the memory including a table of I/O codes. The I/O codes can be used to express predetermined combinations of the input/output devices between which data can be transferred.

U.S. Pat. No. 5,027,221 discloses a digital image recording system comprising an IIT, an IOT, a compressor/decompressor arrangement, a controller and a storage unit. The IIT and IOT are coupled with the controller by way of a first bus so that scanning and printing rates of the recording system can be controlled by the controller, while the compressor and decompressor are coupled with the controller by way of a second bus so that compression/decompression rates can be controlled by the controller. The storage unit communicates with the ITT and compressor for permitting temporary or long-term storage of image data generated at the IIT.

U.S. Pat. No. 5,038,218 discloses a digital copying apparatus comprising a video processor coupled with a plurality of input devices and a plurality of output devices. Each input device is selectively coupled with the video processor by way of an input selector while each output device is selectively coupled with the video processor by way of an output selector. The video processor comprises a main control circuit, the main control circuit communicating with the input and output selectors as well as a DMAC, a memory section, a plurality of image manipulation devices and a plurality of input/output devices.

The following patents relate generally to electronic reprographic systems, and may be of pertinence to the present discussion:
U.S. Pat. No. 4,169,275
Patentee: Gunning
Issued: Sep. 25, 1979
U.S. Pat. No. 4,205,350
Patentee: Gunning
Issued: May 27, 1980
U.S. Pat. No. 4,672,186
Patentee: Van Tyne
Issued: Jun. 9, 1987

U.S. Pat. Nos. 4,169,275 and 4,205,350 each disclose a reproduction scanning system having intermediate storage between input and output scanning stations wherein an input document is scanned in first and second directions, the first direction being orthogonal to the second direction, and the electrical signals being representative of information on the scanned document stored on an intermediate storage member. The information stored in the intermediate storage member may be read out and reproduced on a reproducing medium.

U.S. Pat. No. 4,672,186 discloses a document scanning system which scans printed documents for subsequent storage, retrieval and manipulation. A computer interfaces with a computer I/O bus and printer interface. The computer also controls the operation of a video terminal subsystem through a buffer interface and a synchronous data link control master. A high speed transport system is employed to transport individual documents through image capture stations, machine readers, encoders and sorters.

It would be desirable to provide a computer-driven video processor for a multi-function printing apparatus in which the computer is capable of transferring data and/or addresses with a system memory independent of the video processor transferring data and/or addresses with other I/O devices. Additionally, the computer would possess the capability of transferring data and/or addresses with the system memory substantially concurrent with the video processor transferring data and/or addresses with the other I/O devices.

SUMMARY OF THE INVENTION

In accordance with the present invention a video processor is provided for a printing apparatus, the video processor being adapted to transfer a set of image data, in the form of bytes, from an input device to an output device. The printing apparatus has computer means for controlling operation of the input and output devices as well as the video processor, while the video processor has an image bus across which the set of image data can be transmitted. The video processor comprises means, communicating with the input device, for buffering a preselected number of the bytes, as well as means, communicating with the buffering means, for selectively storing the preselected number of bytes. The storing means includes predesignated addresses at which the bytes can be stored, and the computer means communicates with the storing means. The video processor further comprises means, communicating with the buffering means and the storing means, for enabling transfer of the preselected number of bytes in the buffering means to the predesignated addresses. Preferably, the computer means is capable of transmitting data independent of the buffering means so that data can be transferred between the computer means and the storing means while image data is being accumulated in the buffering means.

In one aspect of the disclosed invention, the video processor further comprises a second image bus interconnecting the input device and the output device. Accordingly, image data can be transmitted directly to the output device while the bytes are being transmitted to the buffering means.

In yet another aspect of the disclosed invention, the predesignated addresses are in a sequence, and the video processor further comprises means, communicating with the storing means, for counting through the sequence of addresses. As the counting means counts through the sequence of addresses, each byte of the preselected number of bytes can be inserted into a respective address of the sequence of addresses. In one example, second counting means, communicating with the storing means, is provided so that the sequence of addresses can be counted by a selected one of the first counting means and said second counting means.

Numerous features of the present invention will be appreciated by those skilled in the art.

One feature of the present invention is that the computer means can be operated on a bus separate from the buffering means so that the computer means can transfer data with the storing means without passing the data through the first buffering means. Accordingly image data can be accumulated in the first buffering means while the computer means is transferring data with the storing means. Moreover the computer means can include a data source adapted to transmit a second set of image data to the storing means while the first set of image data is being accumulated in the first buffering means.

Another feature of the present invention is that image data can be transferred to the storing means in a burst mode. More specifically, image data can be transferred with a control logic circuit, instead of the computer means. Consequently, it is possible to achieve rates of data transfer that are in "real time," rather than the slower rate that would be achieved by transferring the image data with the computer means. This relatively high data transfer rate allows the video processor to be highly multifunctional. For instance, in the time saved by burst mode transfer, other I/O devices, such as a system microprocessor, a refresh controller and a disk drive controller are able to access the image bus.

Yet another feature of the present invention is that delays in printing can be minimized by employment of a "direct data" bus. In particular, the user is able to obtain at least one set of copies concurrent with the input of image data to the storing means. Indeed, in one example, the input and output devices can be chosen to obtain synchronous input/output operations on the direct data bus.

Yet another feature of the present invention is that data transfer can be facilitated by use of a package including an integrated adaptive compressor (IAC) and an integrated adaptive decompressor (IAD). In the preferred mode of operation, the IAD and IAC are respectively coupled with two first-in/first-out burst buffers, the buffers permitting image data to be accumulated while other operations are being performed in the video processor.

Another feature of the present invention is that the control logic circuit can be used with multi-function counting means to facilitate transfer and management of data. For example, the counting means can be used to prevent over-writing in the storing means or page buffer so that designated portions in the page buffer stack can be made inaccessible to the user. In another example, the counting means comprises two address counters providing for a "dual-pointer arrangement." Accordingly, a sequence of addresses can be pointed to by one of the counters to perform one type of operation, such as writing, and then the same sequence can be pointed to by the other counter to perform another type of operation, such as reading.

These features along with other aspects of the invention will become apparent from the following description, the description being used to illustrate a preferred embodiment of the invention when read in conjunction with the accompanying drawings.

DESCRIPTION OF A PREFERRED EMBODIMENT OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
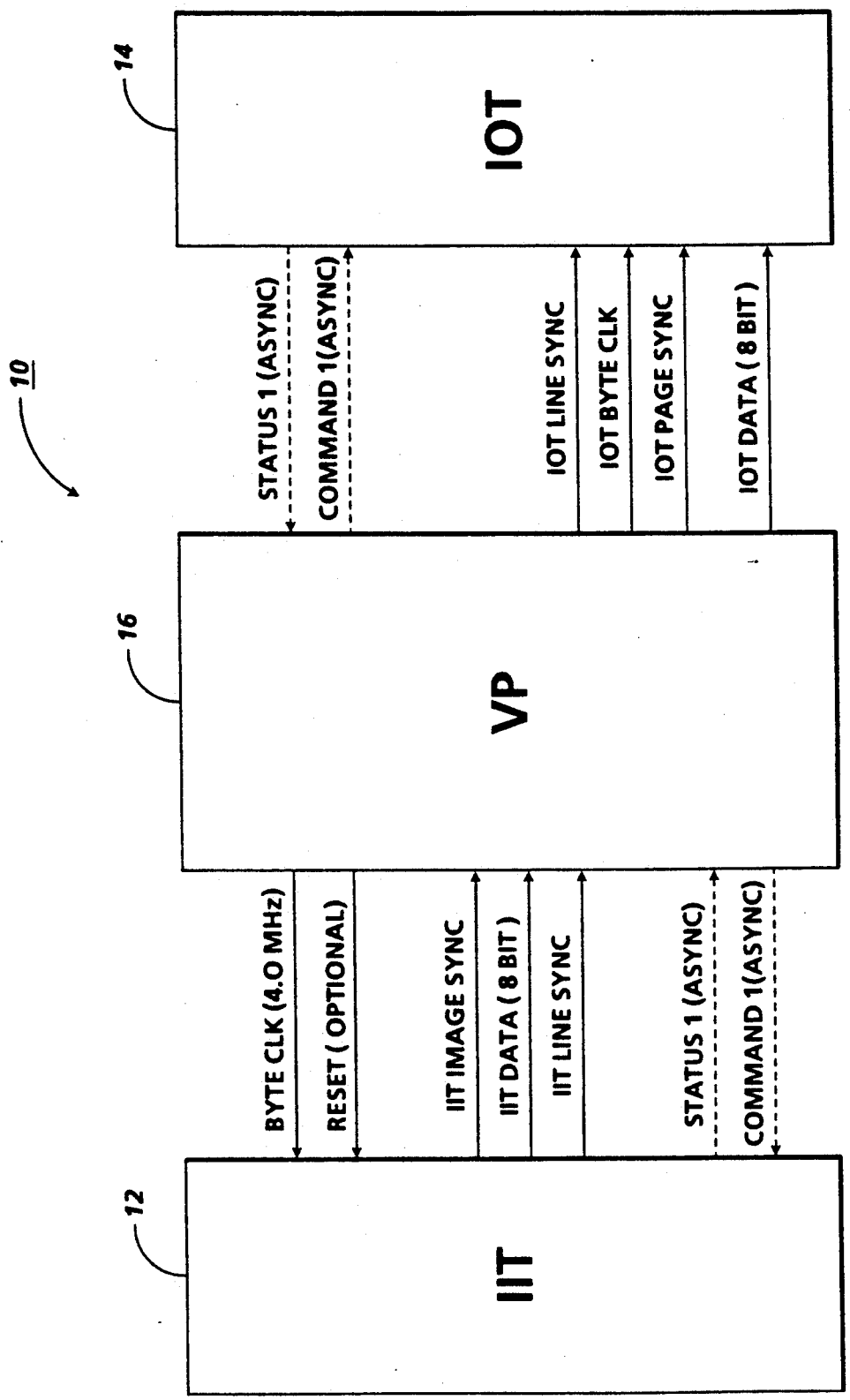
FIG. 1 is a schematic, block diagramatic representation of an apparatus including a video processor.
Figure 2:
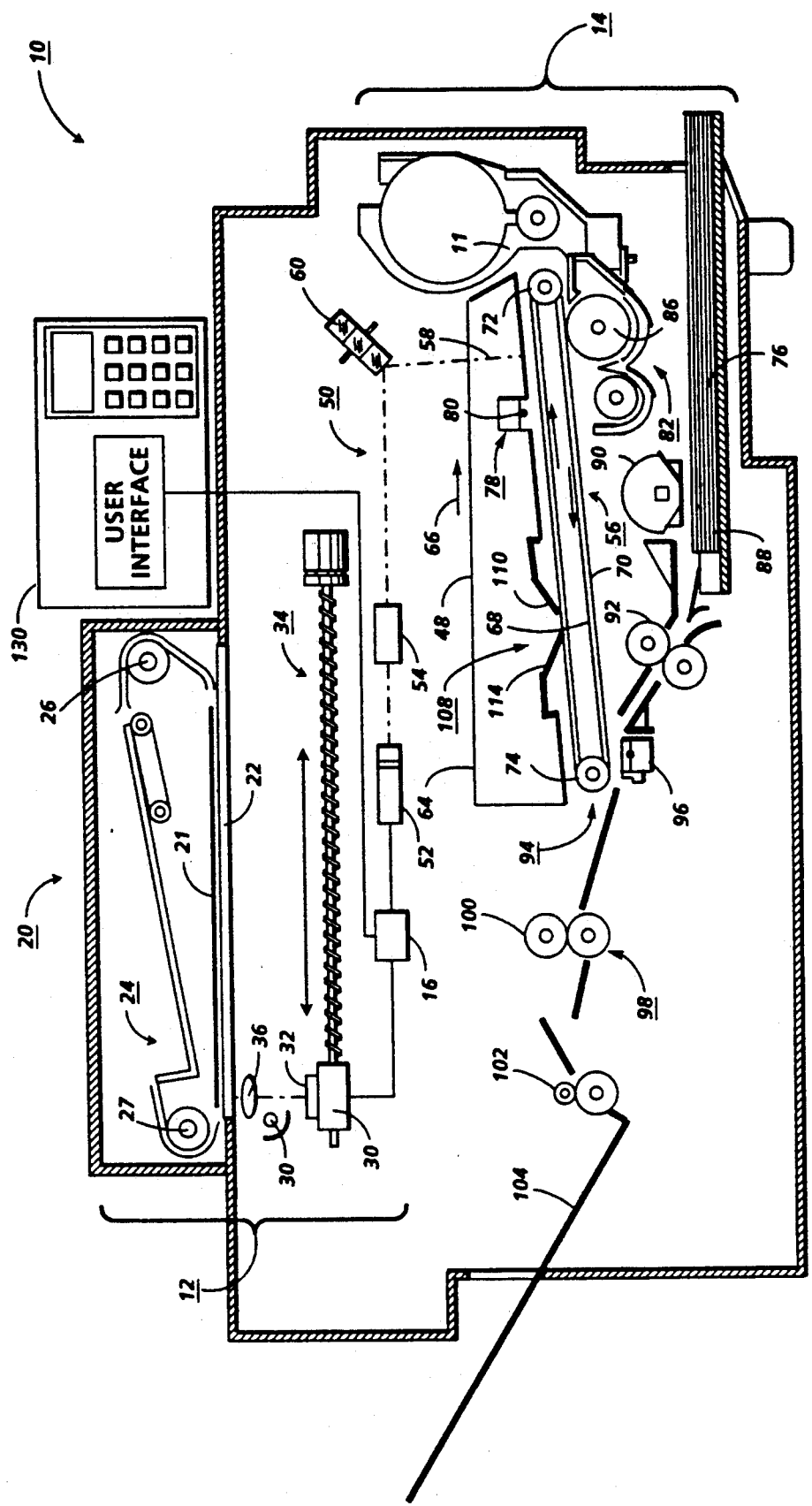
FIG. 2 is sectional, partially schematic view of the apparatus.

Referring to the drawings, in which like reference numerals designate identical or corresponding parts throughout the several views, and more particularly to FIGS. 1 and 2, there is shown an exemplary printing apparatus 10 for processing image data in accordance with the teachings of the present invention. Generally, the printing apparatus 10 comprises an image input terminal (IIT) 12, image output terminal (IOT) 14, and a video processor (VP) 16. Referring to FIG. 2, the IIT 12, the IOT 14 and the VP 16 are shown in a digital copying apparatus. As will be appreciated by those skilled in the art, the concepts underlying the printing apparatus 10 are applicable to many types of machines employing a scanning device coupled with a printing or output device.

For inputting image data, the IIT 12 (FIG. 2) includes a scanning section having an automatic document handler (ADH) 20 for automatically and sequentially placing one or more documents 21 on a transparent platen 22. In one example, the document 21 to be scanned is brought from a document tray 24 forward by the document handlers 26,27 into position on the platen 22 for scanning. Following scanning, the document 21 is returned to the document tray 24. While a particular document handler is shown, one skilled in the art will appreciate that other document handler types may be used instead or the documents 21 may be placed manually on the platen 22.

In the preferred embodiment, the scanning section of the IIT 12 employs one or more linear scanning arrays 30, which arrays 30 may comprise charge couple devices (CCDs) supported below and in scanning relation to the platen by a carriage 32. To scan a document placed on the platen 22, the carriage 32 can be reciprocated by reciprocating means 34, the reciprocating means 34 being similar to the reciprocating arrangement disclosed in U.S. Pat. No. 4,387,636 to Daniele et al., the pertinent portions of which patent are incorporated herein by reference. A suitable lens 36 is provided to focus arrays 30 on a line-like segment of the platen 22 and the documents resting thereon. A suitable lamp 38 illuminates the document line being scanned.

Figure 3A:
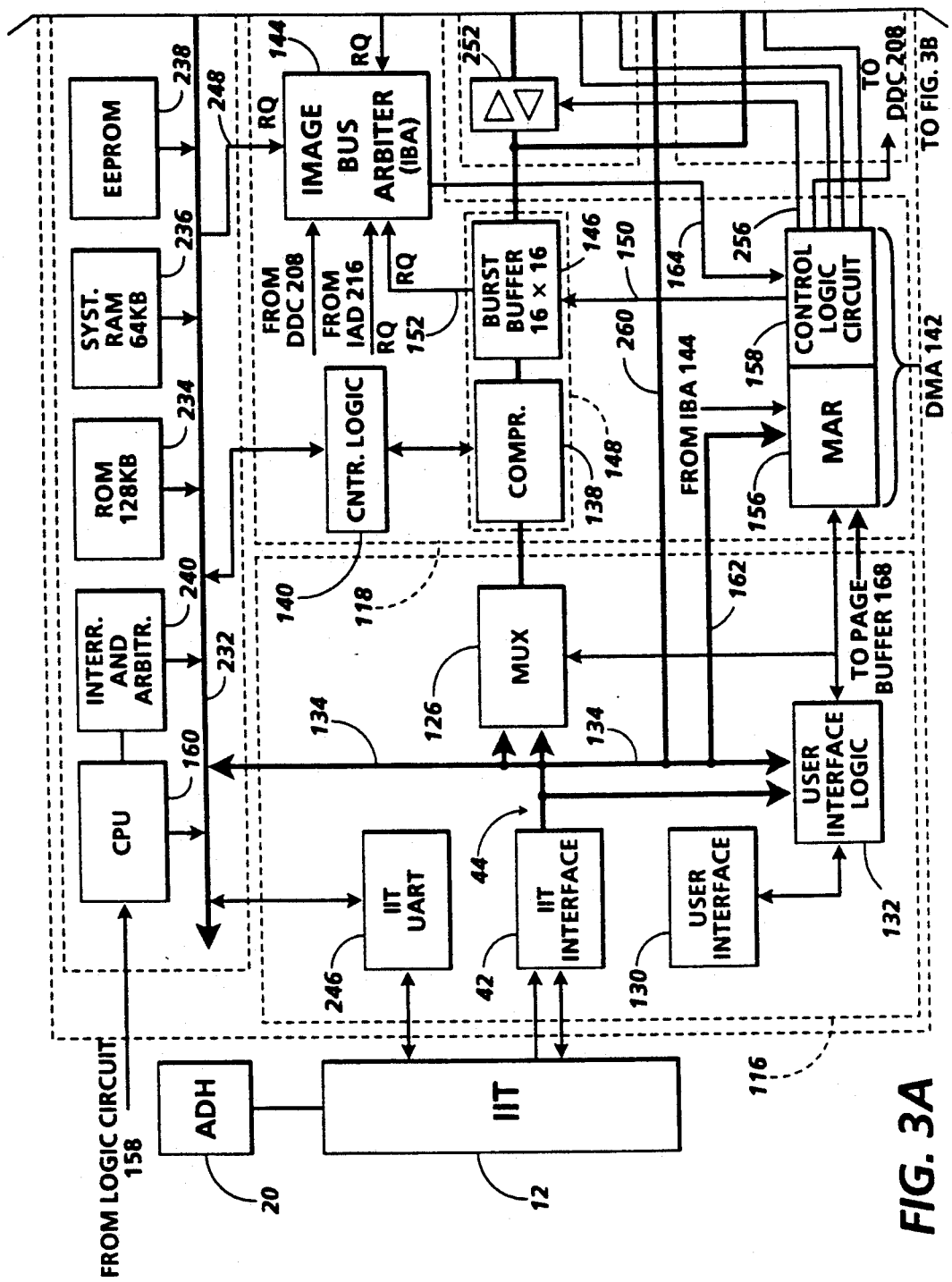
FIGS. 3A and 3B, viewed together, are a schematic, block diagramatic representation of the apparatus.
Figure 4:
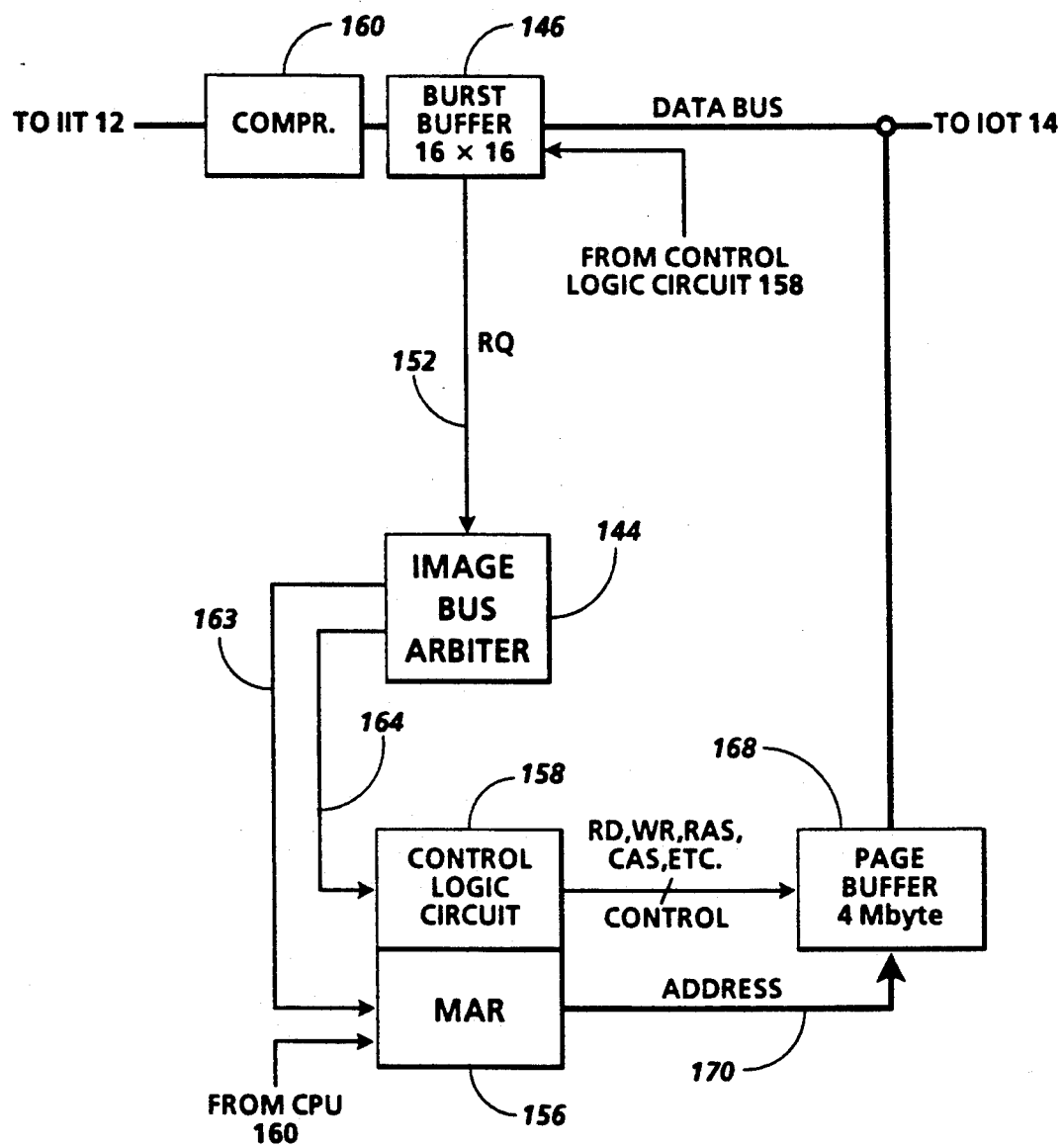
FIG. 4 is a partial view of the representation of FIGS. 3A and 3B showing an arrangement for transferring image data from an input buffer to a page buffer in a burst mode.

Referring to FIGS. 3A and 4, arrays 30 provide electrical image data or pixels representative of the document image scanned which are inputted to the VP 16 across a suitable IIT interface 42. As will be understood, the image data may be used for purposes other than printing copies, as for example, the image data may be transmitted via a communication channel (not shown) to another location, or stored, etc. In the preferred embodiment, the interface 42 includes differential transmitters/receivers and appropriate control logic adapted to provide data/control flow between the IIT 12 and the VP 16. In the preferred embodiment, interface 42 provides for an 8 bit wide image data bus 44 having a constant transfer rate of 4 Mbytes/sec.

Image data is transmitted from the VP 16—the structure and operation of which VP 16 is explained in further detail below—to the IOT 14 by way of an IOT interface 46. Referring again to FIG. 1, the IOT 46 provides image data and control signal paths between the IOT 14 and the VP 16 as well as includes two two scan line deep ping-pong buffers (not shown), the ping-pong buffers preferably being two 2 K×8 SRAMs. In the preferred form of operation, the image data is clocked out of the IOT interface 46 by way of a byte clock (not shown).

Referring specifically to FIG. 2, the structure and operation of the IOT 14 is explained in further detail. The IOT 14 includes a raster output scanner (ROS) 50 having a suitable source of high intensity light, such as laser 52, modulated in accordance with the content of the image data as by an acousto-optic modulator 54 to provide zero and first order imaging beams. The imaging beam is scanned across a photoreceptor 56 at an exposing station 58 by a scanning polygon 60 to expose the previously charged photoreceptor 56 and create a latent electrostatic image or the document represented by the image signals to modulator 54. Suitable means (not shown) are employed to focus the beam on the photoreceptor 56.

The printing apparatus 10 illustrated in FIG. 2 employs a removable processing cartridge 64 which may be inserted and withdrawn from the main machine frame in the direction of arrow 66. Cartridge 64 includes the photoreceptor 56, which in one example comprises a belt like member 68, the outer periphery of the belt like member 68 being coated with a suitable photoconductive material 70. The belt 68 is suitably mounted for revolution within the cartridge 64 about driven transport roll 72, around idler roll 74 and travels in the direction indicated by the arrows on the inner run of the belt to bring the image bearing surface thereon past the plurality of xerographic processing stations. Suitable drive means such as a motor, not shown, are provided to power and coordinate the motion of the various cooperating machine components whereby a faithful reproduction of the original input scene information is recorded upon a sheet of final support material 76, such as paper or the like.

Initially, the belt 68 moves the photoconductive surface 70 through a charging station 78 wherein the belt 68 is uniformly charged with an electrostatic charge placed on the photoconductive surface 70 by charge corotron 80 in known manner preparatory to imaging. Thereafter, the belt 68 is driven to the exposure station 58 wherein the charged photoconductive surface 70 is exposed to line-by-line scanning of the ROS 50, whereby the charge is selectively dissipated in the light exposed regions to record the original input image in the form of electrostatic latent image. The speed of the scanning carriage 32 and the speed of the belt 68 are synchronized to provide faithful reproduction of the original document.

After exposure of belt 68 the electrostatic latent image recorded on the photoconductive surface 70 is transported to development station 82, wherein developer is applied to the photoconductive surface 70 of the belt 68 rendering the latent image visible. The development station 82 includes a magnetic brush development system including developer roll 86 utilizing a magnetizable developer mix having course magnetic carrier granules and toner colorant particles.

Sheets 76 of the final support material are supported in a stack arranged on elevated stack support tray 88. With the stack at its elevated position, the sheet separator segmented feed roll 90 feeds individual sheets therefrom to the registration pinch roll pair 92. The sheet 76 is then forwarded to a transfer station 94 in proper registration with the image on the belt and the developed image on the photoconductive surface 70 is brought into contact with the sheet 76 of final support material within the transfer station 94 and the toner image is transferred from the photoconductive surface 70 to the contacting side of the final support sheet 76 by means of transfer corotron 96. Following transfer of the image, the final support material 76 is separated from the belt 68 by the beam strength of the support material 76 as it passes around the idler roll 74, and the sheet 76 containing the toner image thereon is advanced to fixing station 98 wherein roll fuser 100 fixes the transferred powder image thereto. After fusing the toner image to the sheet 76, it is advanced by output rolls 102 to sheet stacking tray 104.

Although a preponderance of toner powder is transferred to the final support material 76, invariably some residual toner remains on the photoconductive surface 70 after the transfer of the toner powder image to the final support material. The residual toner particles remaining on the photoconductive surface after the transfer operation are removed from the belt 70 by a cleaning station 108, which cleaning station 108 comprises a cleaning blade 110 in scrapping contact with the outer periphery of the belt 68 and contained within a cleaning housing 112, the cleaning housing 112 having a cleaning seal 114 associated with the upstream opening of the cleaning housing 112. Alternatively, the toner particles may be mechanically cleaned from the photoconductive surface by a cleaning brush as is well known in the art.

Figure 3B:
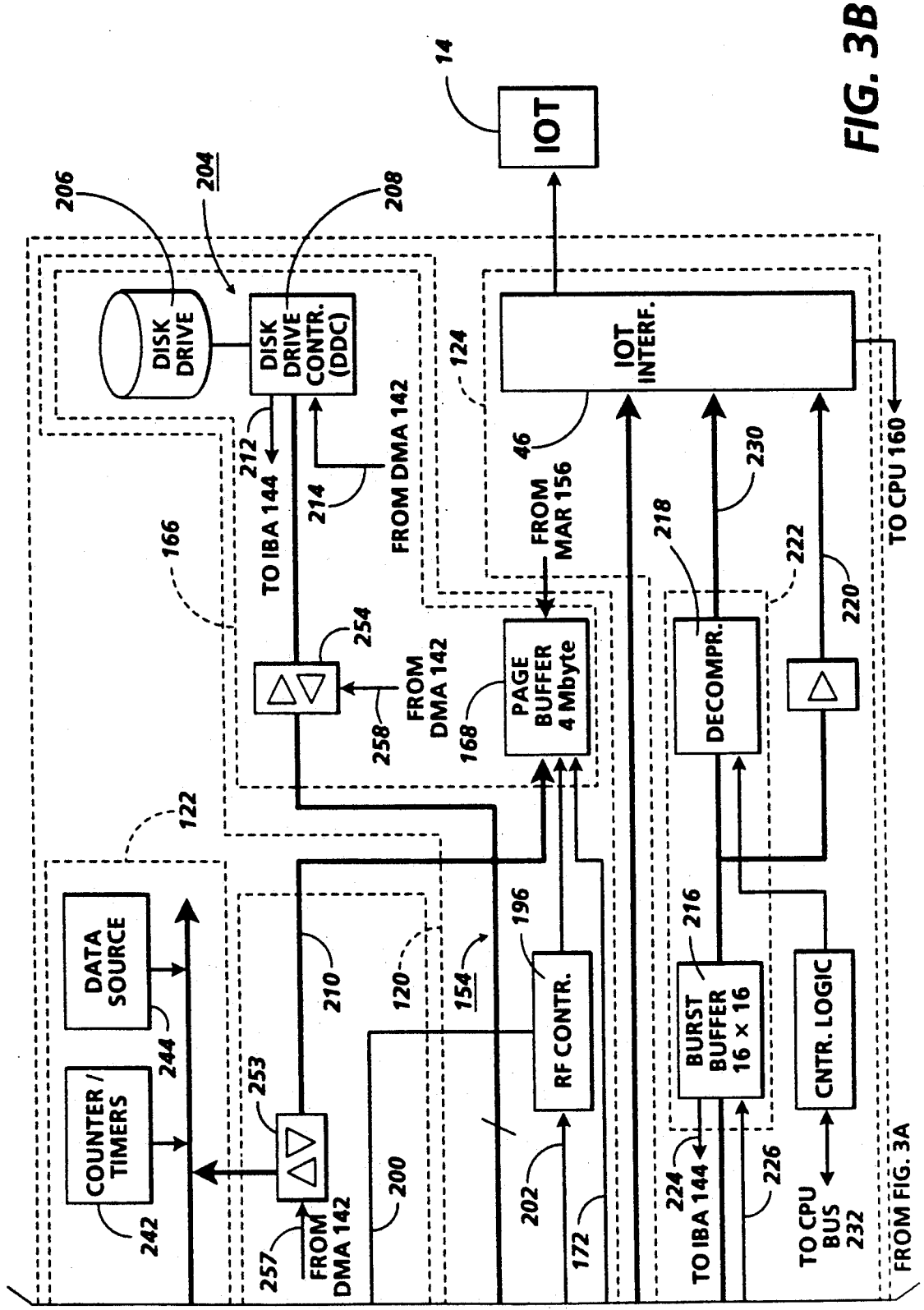

Referring to FIGS. 3A and 3B, the structure of the VP 16 is explained in further detail. The VP 16 comprises an input network 116, a first memory interface network 118, a memory network 120, a computer network 122 and a second memory interface network 124. The input network 116 comprises a multiplexor (MUX) 126 as well as a user interface (UI) 130 coupled with suitable UI logic circuitry 132. A 16-bit bus 134 allows the MUX 126 and the UI logic circuitry 132 to communicate with the computer network 122. Additionally, the 8-bit image data bus 44 communicates with the MUX 126 and the UI logic circuitry 132. In one example, the UI 130 includes conventional control circuitry coupled with a CRT, the control circuitry being adapted to initiate operation of the printing apparatus 10 in a known manner.

The first memory interface network 118, which network 118 (FIG. 3) includes a compressor 138 coupled with the computer network 122 by suitable control logic circuit 140, a direct memory access (DMA) circuit 142, an image bus arbiter 144 and a burst buffer 146. In the preferred embodiment, the compressor 138 comprises conventional components of the type suitable for use with the adaptive algorithm disclosed in U.S. Pat. No. 4,559,563 (to Joiner, Jr.) ("'563 patent"), the pertinent portions of which are incorporated herein by reference. Additionally, the control logic 140 can comprise a known I/O device, such as the 8255 I/O port manufactured by Intel, Corp. One purpose of the compressor 138 is to maximize the rate at which data can be transmitted to the memory network 120. In the preferred form of operation, compression ratios of up to 30:1 have been achieved.

In the preferred embodiment, the compressor 138 is coupled with the burst buffer 146 as an integrated adaptive compressor (IAC), the IAC being designated by the numeral 148. While the illustrated burst buffer 146 of FIG. 3 is a "first in/first out (FIFO)" type buffer having a capacity of 64 Bytes, in other contemplated embodiments ping-pong buffers, such as the ones used in the IOT interface 46, could be substituted for the FIFO burst buffer 146. As is conventional, 8 bit bytes inputted to the IAC 148 by way of bus 44 can be combined into 16 bit bytes for transmission to the memory section 120. The IAC 148 is interconnected with the DMA circuit 142 by a control line 150, and with the IBA 144 by way of a request line 152.

Image data, in the form of 16-bit bytes are transmitted through the memory network 120 by way of a 16 bit bi-directional image bus 154. Transmission of the image data from the IAC 148 is accomplished by use of the DMA circuit 142. Referring to FIG. 4, the DMA circuit 142 includes a memory access register (MAR) 156 and a control logic circuit 158, the control logic circuit 158 being adapted to transfer image data to and from I/O components, such as the IAC 148. As will be explained in further detail below, programming of the MAR 156 is achieved by use of the computer network 122, and more specifically with a CPU or MPU 160. In the illustrated embodiment of FIG. 4, the MAR 156 is packaged with control logic circuit 158, and the the MAR 156 (FIGS. 3 and 5) is coupled with the CPU 160 by way of a data bus 162 (PD00-PD15). Additionally, the MAR 156 and the control logic circuit 158 are coupled with the image bus arbiter 144 by way of respective control lines 163, 164.

Referring still to FIGS. 3 and 4, the memory network 120 includes a memory section 166 having a page buffer 168, the page buffer 168 being interconnected with the MAR 156 by a 24-bit address bus 170, and with the control logic circuit 158 by a control line 172. As will be explained in further detail below, read, write and other appropriate page buffer control signals can be transmitted across the control line 172 in response to commands transmitted by the IBA 144 to the control logic circuit 158.

Figure 5:
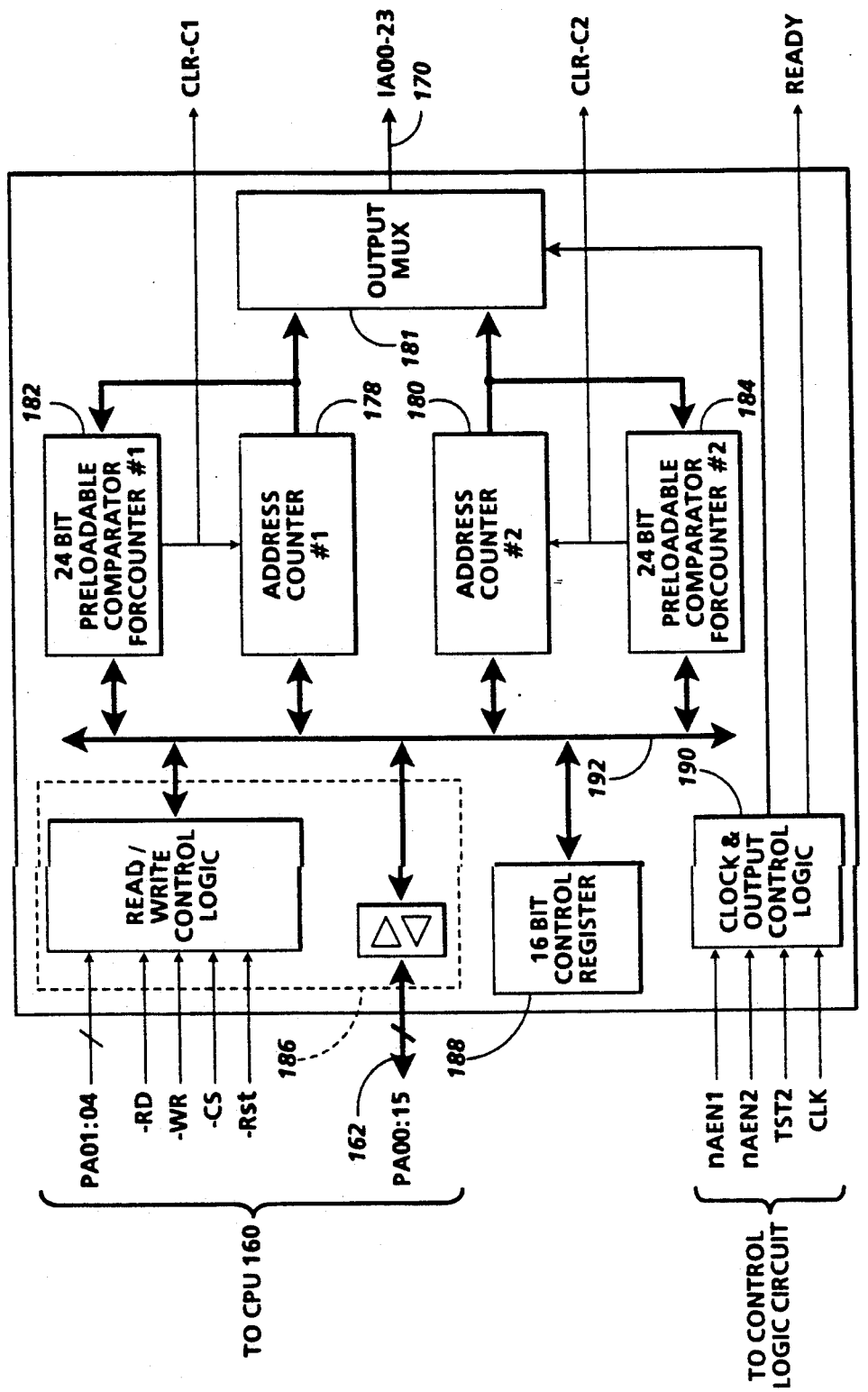
FIG. 5 is a schematic, block diagramatic representation of a memory access register (MAR) shown in FIGS. 3A and 4.

Referring specifically to FIG. 5, the structure of the MAR 156 is described in further detail. The illustrated MAR 156 includes a first address counter 178 and a second address counter 180, both of which counters 178, 180 are selectively coupled with the address bus 170 by way of a 2:1 MUX 181, the MUX 181 having a tri-stated output. Additionally, a first 24-bit preloadable comparator 182 and a second 24-bit preloadable comparator 184 are respectively coupled with the address counters 178, 180. Each of the comparators 182, 184 is adapted to set the beginning and finishing addresses of the address counter to which it is coupled.

In the preferred embodiment, each of the counters 178, 180 and the comparators 182, 184 is coupled with an MPU interface 186, a control register 188, as well as a clock output and control logic circuit 190, by way of a suitable bus 192. As shown in FIG. 5, the MPU interface 186 preferably comprises various control lines which permit control of the MAR 156 by the CPU 160. For example, the four address lines PA1-PA4 can be used to set each internal register of the MAR 156, while the 16-bit bi-directional data bus lines of bus 162 can be used to provide control data for the control register 188. Moreover, the control register 188 is divided into two sections, with one section being dedicated to the first counter 178, and the other section being dedicated to the second counter 180. Finally, the clock output and control logic circuit 190, which can provide a clock rate of up to 32 MHz, is adapted to select which of counters 178, 180 is to be placed on the address bus 170 to count from one address to another.

Referring again to FIGS. 3A and 3B, to provide cost saving, dynamic random access memory (DRAM) can be used to comprise the page buffer 168. Preferably the page buffer 168 has 4 Mbytes of DRAM. As will be appreciated by those skilled in the art, DRAM is a relatively inexpensive alternative to static RAM. When using DRAM, periodic refreshment is generally required by, for example, a conventional refresh control device ("RF controller") 196, which device 196 can be coupled with the page buffer 168 by way of the image data bus 154. The RF controller 196 communicates with the IBA 144 via request line 200, and with the control logic circuit 158 via a control line 202.

In those embodiments in which large quantities of data are to be stored in the memory section 166, a disk drive module 204 is disposed on the image data bus 154. The disk drive module 204 includes a disk drive 206, such as a "Winchester"-type hard disk drive with 50 Mbyte capacity, coupled with a disk drive controller ("DDC") 208. Further information regarding the structure and operation of the disk drive controller 208 is discussed in [Disk Drive Controller Application]. In the preferred embodiment, the module 204 communicates with the page buffer 168 via the image data bus 154, as well as with the computer network 122 via the image bus 154 and an intermediate bus 210. Additionally, the disk drive controller 208 is coupled with the IBA 144 by way of request line 212, and with control logic circuit 158 by way of control line 214.

The second memory interface network 124 comprises a burst buffer 216, a decompressor 218 and an 8-bit raw data bypass bus 220. In the preferred embodiment the burst buffer 216 is structurally equivalent to the burst buffer 146, and the decompressor 218 is part of the same IC package as the compressor 138. As with IAC 148, the burst buffer 216 is preferably coupled with the decompressor 218 to form an integrated adaptive decompressor (IAD) 222. The IAD 222 is coupled with the IBA 144 by way of request line 224, and with control logic circuit 158 by way of control line 226. The output of the burst buffer 216 is preferably 8-bit and the decompressor 218 is on an 8-bit data bus 230. The output of the decompressor 184 can be transmitted to the IOT interface 46 for printing, in a known manner, at the ROS 50.

The computer network 122 includes the CPU 160 coupled with a 16-bit CPU bus 232. In the preferred embodiment, the CPU 160 comprises a Motorola 68020 microprocessor capable of operating at a clock frequency of 10 MHz. Additionally the CPU bus 232 preferably comprises a 16-bit wide data bus, 23-bit wide address bus and control lines. Various types of memory, namely a ROM device 234, a system RAM device 236 and an EEPROM device 238, are respectively coupled with the CPU bus 232 to support the CPU 160 in a known manner. A local interrupt and arbitration device 240 as well as a counter(s)/timers section 242 are coupled to the CPU bus 232 to facilitate management and operation of the CPU bus 232 in a known manner.

It should be appreciated that an input device or data source 244, such as a workstation or another scanner can be coupled to the the CPU bus 232 so that data can be inputted to the memory section 166 concurrent with other I/O operations, such as accumulating image data in the burst buffer 146. Those skilled in the art will recognize that when certain input devices 244 are coupled to the CPU bus 232, such as a workstation, a suitable interface is preferably employed to achieve suitable coupling. Referring still to FIGS. 3A and 3B, the CPU 160 can be interconnected with the IIT 12, by an IIT universal asynchronous receiving/transmitting (UART) device 246. For the illustrated embodiment of FIG. 3, the CPU 160, as well as any device coupled to the bus 232, can use the CPU bus 232 and a request line 248 to seek access of the image data bus 154 through the IBA 144. The CPU 160 is coupled to the control logic circuit 158 by way of buses 134, 162 and 232.

It should be appreciated that the CPU 160 represents the "brains" of the VP 16. First, the CPU 160 serves as an operating system for the VP 16 in that it is responsible for, among other things, system initialization, "housekeeping," system management and communication with I/O devices. In particular, the CPU 160 serves as a diagnostic tool for VP 16—transmitting diagnostic signals through the MUX 126 and receiving feedback signals across the buses 210, 232. Second, as explained in further detail below, the CPU 160 plays a major role in facilitating data transfer by way of its communication with the DMA 142 across data bus 162. Third, the CPU 160 is capable of transferring data with the UI 130 and/or the page buffer 168 for manipulating image data. For instance, the CPU 160 has registers in which various known digital operations, such as resolution conversion and data rotation, can be performed on the image data. Finally, since the CPU 160 is in direct communication with the page buffer 168, by way of bus 210, the CPU 160 can transfer data with the page buffer 168 independent of the IAC 148. Consequently, data can be transferred directly between the page buffer 168 and the CPU 160 while image data is being accumulated in the burst buffer 146.

To optimize the bandwidth capability of the image data bus 154, data can be selectively transmitted to and from the page buffer 168 with the aid of transceivers 252–254. In one example, the transceivers 252–254 are coupled to the control logic circuit 158 by way of respective control lines 256–258 so that the direction of each of transceivers 252–254, and accordingly the direction of data flow on the data bus 154, can be alternated programmably. Preferably, each of the transceivers comprises a 74F245 bi-directional transceiver manufactured by Texas Instruments, Inc.

As mentioned above, the image data transmitted to IOT interface 46 from page buffer 168 can be printed, in a known manner, at IOT 14. Storing one or more pages of image data before printing, however, can cause some delay in printing. To eliminate such delay, the VP 16 is provided with a "direct data bus" 260, the bus 260 coupling the IIT interface 42 directly with the IOT interface 46. Accordingly, when the input rate of the IIT 12 is synchronized relative to the output rate of the IOT 14, line-by line synchronous input/output operations can be achieved.

Figure 6:
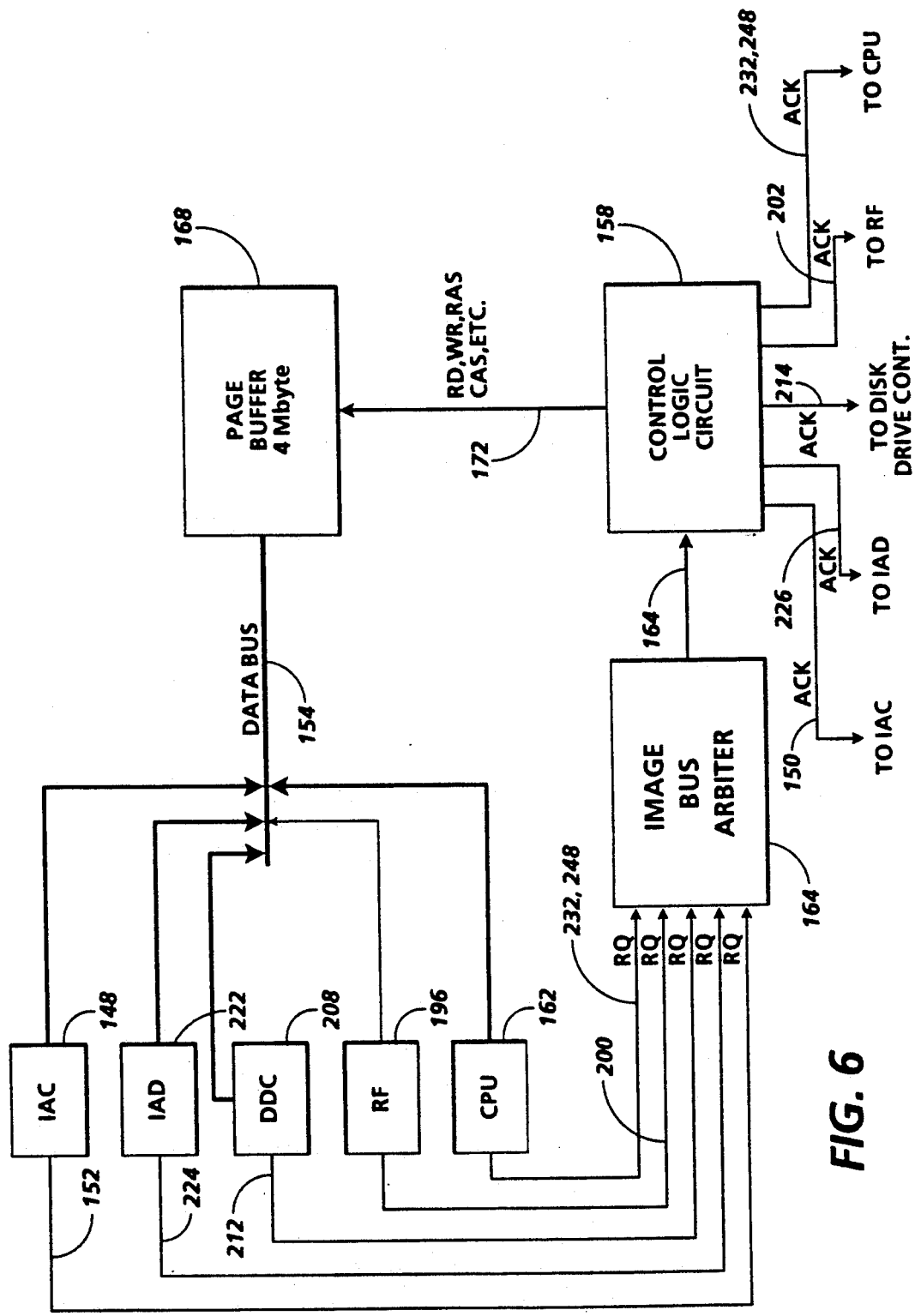
FIG. 6 is a partial view of the representation of FIGS. 3A and 3B showing an arbitration system for controlling the manner in which various system components access a data bus.

Now that all of the structure of the VP 16 has been mentioned, the sequencing role of the IBA 144 can be more fully understood. In the preferred embodiment the IBA 144 is implemented by way of a state machine, namely a Field Programmable Array, such as the PAL 82S105 manufactured by Signetics, Corporation. Referring to FIG. 6, the relationship of the IBA 144 to varios I/O components as well as to the control logic 158 and the page buffer 168, is shown. To seek access to the image data bus 154, and accordingly the page buffer (PB) 168, one or more of the IAC 148, the CPU 160, the RF controller 196, the disk drive controller (DDC) 208, the IAD 222 transmit request signals across respective request lines 152, 248, 200, 212 and 224 to the IBA 144.

In response to software adapted for use with the 82S105 Array, the IBA 144 designates the order in which the above-mentioned components can access the bus 154. More specifically, the IBA 144 causes the control logic circuit 158 to by transmit an appropriate control signal across one of control lines 150, 202, 214, 226 and 250 for selectively permitting one of the above-mentioned components to access the bus 154. As the control logic circuit 158 transmits the appropriate control signal to the designated one of the above-mentioned I/O components, it also transmits information to the page buffer 168, by way of control line 172, regarding which component has been permitted access to the bus 154. It will be appreciated by those in the art that while the sequencing arrangement has been shown with five components, in other contemplated embodiments additional components could be sequenced and controlled by the arrangement of the IBA 144 and the control logic circuit 158 without altering the concept disclosed by the present description.

Figure 7:
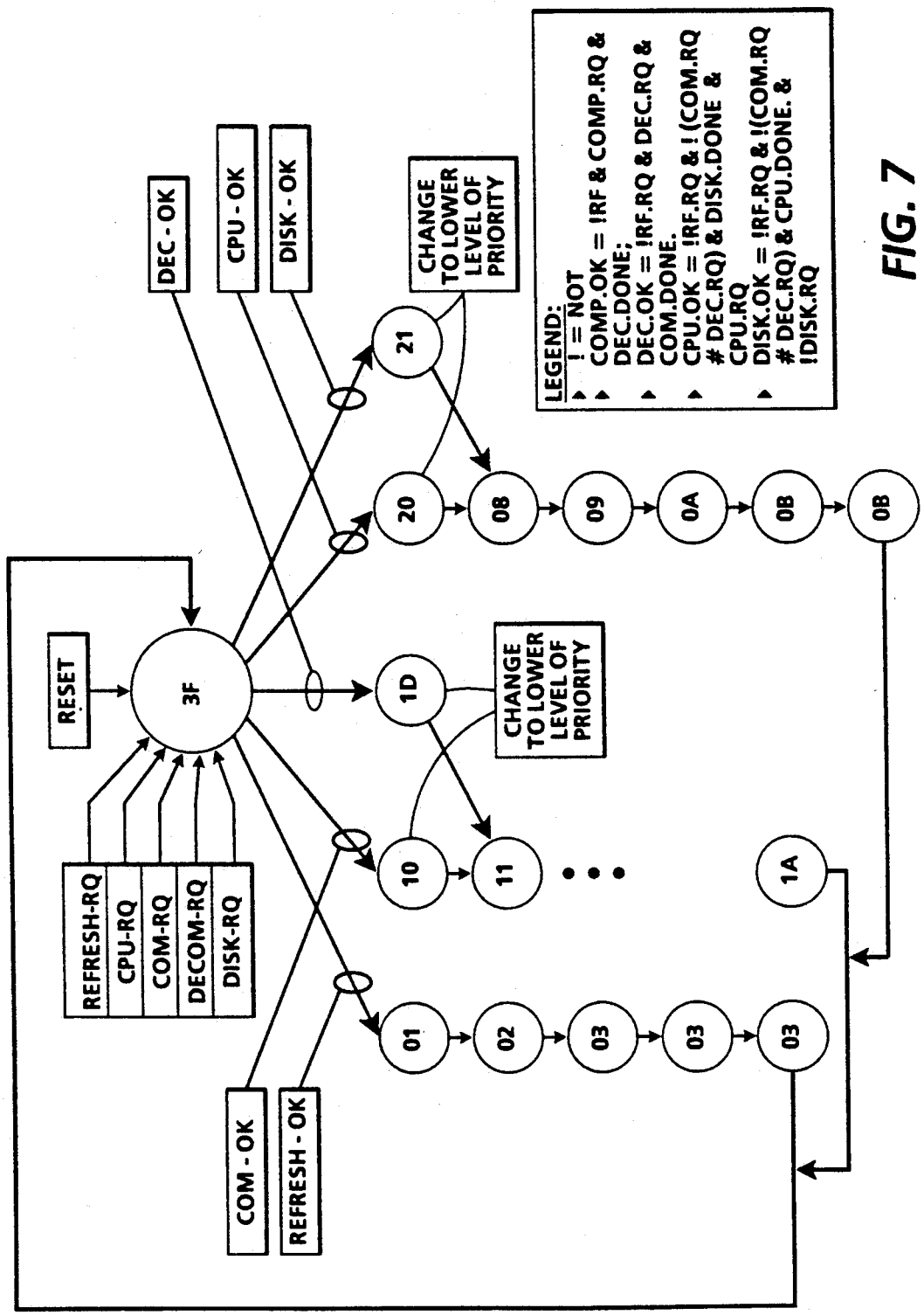
FIG. 7 is a state diagram of the image bus arbiter shown in FIGS. 3A, 4 and 6.

Referring to FIG. 7, the concept underlying the software employed to implement the IBA 144 is discussed in further detail. As will be recognized by those familiar with state diagrams, the numbered "bubbles" represent states through which a state machine can pass. Programming of the PAL 82S105 to accomplish the software of FIG. 7 is known to those skilled in the art. For the example of FIG. 7, in which arbitration is achieved for just five inputs, the PAL of the IBA 144 is driven by a 25 MHz clock and all input signals are synchronized with the clock so that the arbitration time is less than 40 ns. In this example, the priorities of the devices coupled to the IBA 144 are assigned as follows:

| RF 196 | #1 |
|---|---|
| IAC 148/IAD 222 | #2 |
| DDC 208 | #3/#4 |
| CPU 160 | #3/#4 |

As can be recognized, the priorities of the RF 196 as well as IAC 148 and IAD 222 are fixed, while the priorities of the DDC 208 and the CPU 160 are rotated after each data transfer. As will be appreciated from the following discussion, the concept underlying the arbitration process is not affected by the order of priority in which the above-mentioned devices are set. Referring to FIG. 7, the sequencing and rotating capacity of the IBA 144 is explained in further detail. When a request is received at state 3F from one of the five devices, the state machine determines whether a higher priority request is being serviced. For instance, if the IAC 148 or IAD 222 seeks access to the bus 154, the machine checks to see if states 01–03 for the RF 196 are being executed. Assuming that the RF 196 is being serviced, the machine waits until the service routine for the RF 196 to be completed before proceeding to step 10 or 1D. Similarly, if the DDC 208 or the CPU 160 requests access to the bus 154, the machine determines whether the RF 196, the IAC 148 or the IAD 222 is being serviced before proceeding. The sequencing scheme of the arbitration example is elaborated on more completely in the Legend of FIG. 7.

Referring still to FIG. 7, the rotation of the IAC 148 and IAD 222 as well as the DDC 208 and the CPU 160 is achieved by the setting of a "flag." In one example, a request arrives for the IAC 148, the machine proceeds from states 3F to 10 and sets a flag so that the priority of the IAC 148 is set below the priority of the IAD 222. Accordingly, after the process returns to state 3F, if requests are received from IAC 148 and IAD 196 within about the same preselected time interval, the process continues through states 1D–1A rather than 10–1A. Upon proceeding to state 1D, another flag is set so that the priorities of the IAC 148 and IAD 196 are again rotated. Bearing in mind the above example, it will be recognized that the same flag setting approach can be used in servicing the DDC 208 and the CPU 160.

Figure 8:
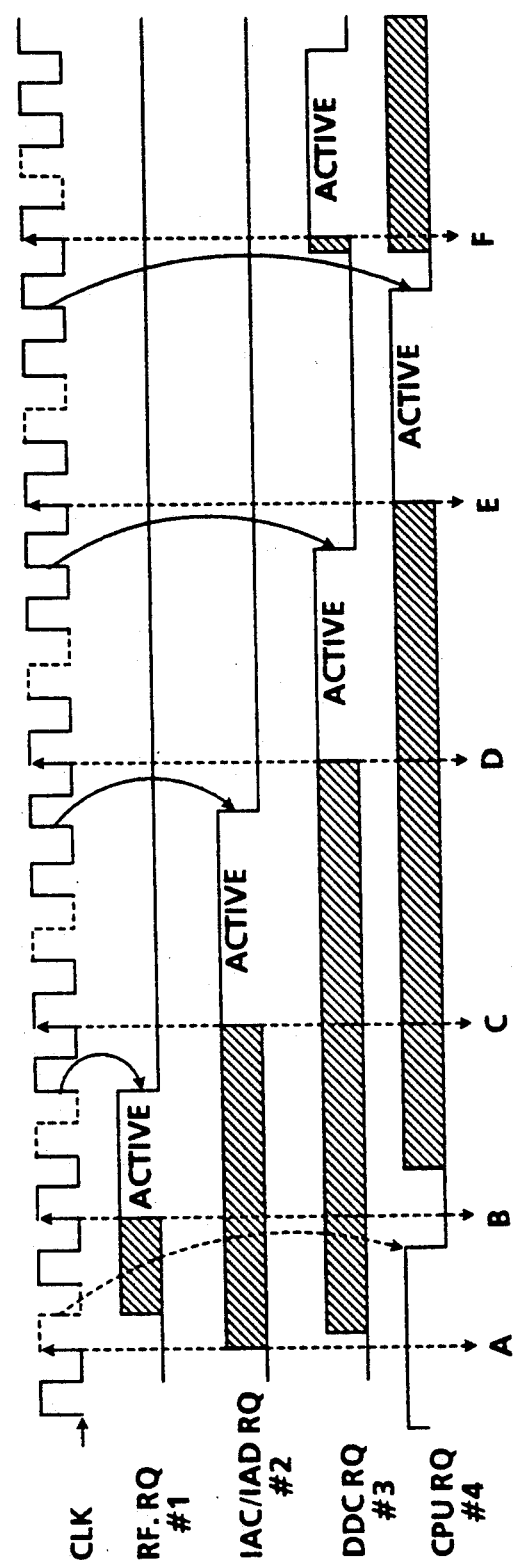
FIG. 8 is a timing diagram demonstrating an exemplary case of operation of the image bus arbiter.

Referring to the timing diagram of FIG. 8, another example of the rotation approach is discussed with greater specificity. The exemplary process begins with the CPU 160 transferring data to the page buffer 168 (active). In the time interval between a and b, the RF 196, the IAC 148, the IAD 22 and the DDC 208 request access to the bus 154. The IBA 144 waits until the CPU 160 transfer is completed and then grants the bus 154 (at time b) to the device having the highest priority, i.e. the RF 196. The IAD 148 or the IAD 222 and the DDC 208 wait until RF 196 has completed its transfer. After the DDC 208 has accessed the bus 154 between times d and e, its priority changes to #4 and at time e the CPU 160 accesses the bus 154. After the CPU 160 has made its second transfer (between times e and f) its priority is changed to #4 and the priority of the DDC 208 is shifted back to #3. Accordingly, at time f, when a concurrent request for the bus 154 comes in from the DDC 208 and the CPU 160, access to the bus 154 is granted to the DDC 208.

Figure 9:
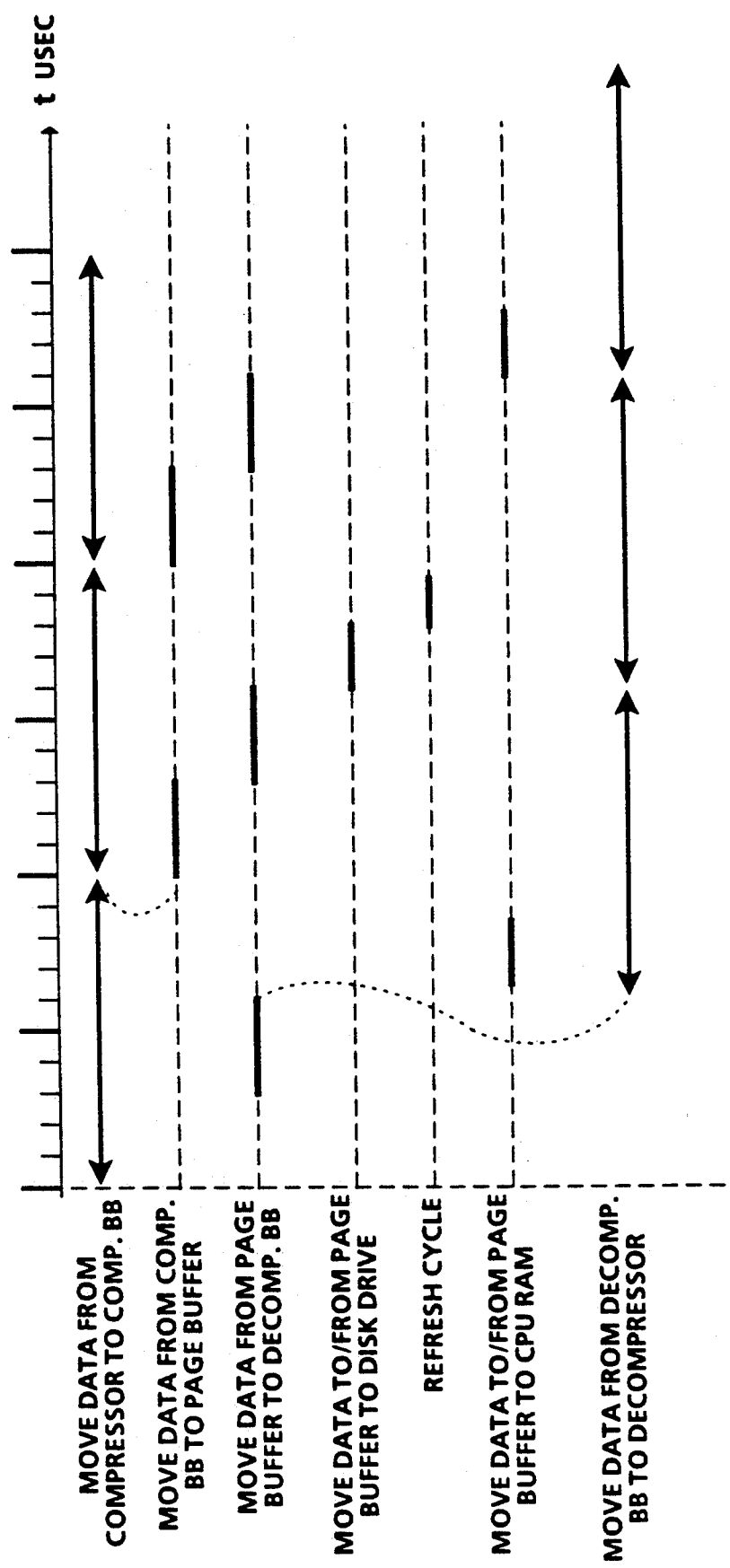
FIG. 9 is a timing diagram demonstrating an exemplary case of operation of the video processor.

Operation of the printing apparatus 10 can be further understood by reference to the exemplary timing diagram FIG. 9. As will be appreciated by those skilled in the many modes of operation, other than the mode of operation discussed below, can be achieved with the various systems and subsystems of the printing apparatus 10 disclosed thus far. To initiate a print job for one or more originals, the parameters of the job, such as number of prints to be made, size of each print, etc., are fed into the UI 130, and the parameters are transmitted accordingly to the CPU 160 by way of bus 134. Prior to transmitting an appropriate scan signal to the scanning section of IIT 12 by way of the IIT UART 246, and a print signal to the IOT interface 46, the CPU 160 communicates with the MAR 156 (FIGS. 3 and 6), by way of data bus 162, to allow for the configuring of addresses in the page buffer 168, the addresses being the 24-bit locations at which image data are stored.

Figure 10:
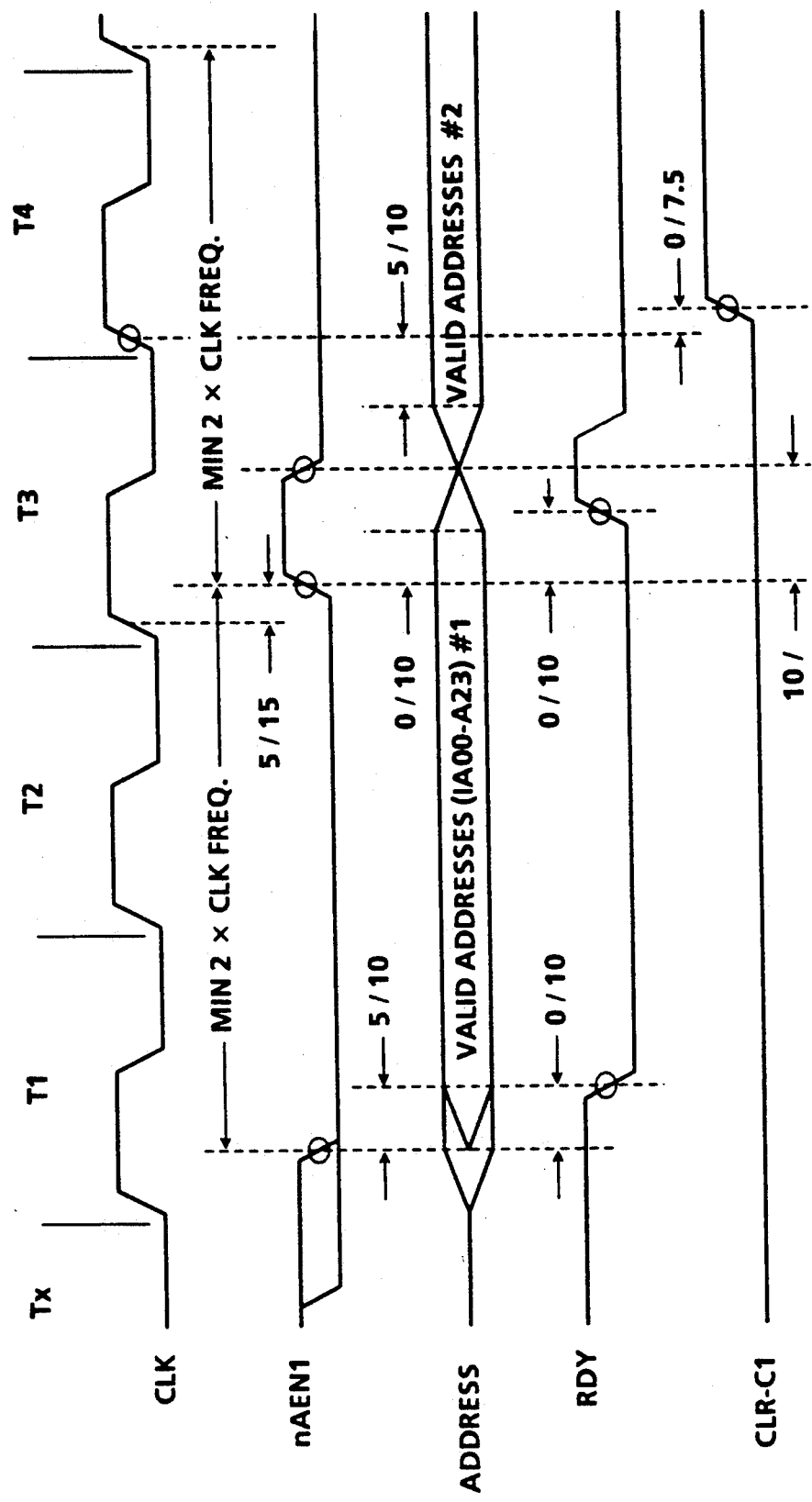
FIG. 10 is a timing diagram demonstrating the use of an address counter to generate addresses for a page buffer.

Upon loading the address counters 178, 180 (FIG. 5) and the comparators 182, 184 with suitable beginning and finishing addresses, by way of CPU interface 186, the scan signal is transmitted to the scanning section of IIT 12. As each line is scanned, the corresponding image data is transmitted to the IAC 148, by way of the MUX 126, and to the IOT interface 46, by way of the direct data bus 260. Referring again to FIG. 9, each byte of image data transmitted to the IAC 148 is compressed, using the adaptive algorithm of U.S. Pat. No. 4,559,563, and temporarily accumulated in the burst buffer 146. As shown in FIG. 9, image data can be written in or read from the page buffer 168 as image data is being accumulated in the burst buffer 146. Referring to FIGS. 4,5 and 10 it will be understood how a byte of image data is written in the page buffer 168. To move a byte of image data from the burst buffer 146, the IAC 148 seeks access to the bus 154 through the IBA 144.

Assuming that the RF 196 does not need the bus 154, the IBA 144 causes the control logic circuit 158 to synchronously transmit three signals to the IAC 148, the MAR 156 and the page buffer. As a result of the first signal being transmitted to the MAR 156, the enabling signal, nAEN1 goes low and a valid address #1 is "pointed to" by the counter 178. While the counter 178, or what may be thought of as the pointer 178, is at the designated address, the second signal, which is transmitted across control line 150, allows the IAC 148 to access the bus 154 so that the image data byte is transferred to the designated address. In response to the third signal transmitted across line 172, the page buffer 168 stores the byte at the designated address.

After nAEN1 goes low, and the RDY signal goes low, the process can be repeated as many times as may be required to transfer a preselected group of bytes. Each time a byte is transferred to the page buffer 168, the address counter 178 advances to the next address location in the page buffer 168 on the rising edge of nAEN1. If the data in the comparator 182 is equal to the count in the counter 178, CLR-C1 will go active active no later than 7.5 ns after the rising edge of the clock. CLR-C1 will stay active until the address in the counter 178 has been placed onto the output bus 170. Subsequently, when nAEN1 goes high, the counter 178 will be reset.

When the above-described process is repeated for a plurality of bytes, the image data is transferred in a rapid transfer mode known as a burst mode. That is, the above-described pointing or counting arrangement, which is commonly referred to as "direct memory access (DMA)," moves data at rates that far exceed those of conventional microprocessor-controlled arrangements. As will be appreciated by those skilled in the art, DMA allows the CPU 160 to perform a wide variety of system control operations without being interrupted to effect image data transfer.

In the preferred form of operation, up to eight (8) 16-bit bytes are accumulated in the burst buffer 146 of the IAC 148, and after buffering the eighth byte, four of the first-collected bytes are transferred to the page buffer 168 in the burst mode. A similar transfer scheme can be achieved for transferring image to and accumulating image data at the IAD 224. In particular, four bytes of image data can be transferred from the page buffer 168 to the burst buffer 216 of the IAD 222 in a burst mode for accumulation therein. In the meantime, the accumulated image data can be transferred to the IOT interface 46, by way of decompressor 218, at a rate that is substantially less than the burst mode transfer rate.

Referring again to FIG. 9, it will be appreciated that components other than the IAC 148 and the IAD 222 can communicate with the page buffer 168 at time intervals in which image data is not being transferred to and from the page buffer 168 in the burst mode. As shown in FIG. 9 there are at least three intervals in which the page buffer 168 respectively communicates with the CPU 160, the RF 196 and the DDC 208 while image data is being accumulated at the burst buffer 146 and/or image data is being transmitted to the IOT interface 46. In one example, image data can be transmitted to the CPU 160 for manipulation thereof, and in another example image data can be stored sequentially in the disk drive 206 for subsequent printing. It will be recognized that use of the disk drive 206 to store image data is preferred when printing of sets of multiple copies is desired.

With reference to to the following example, it will be understood how the above-described design of the VP 16 optimizes utilization of the image bus 154, and thus maximizes multi-functionality of the printing apparatus 10. Since the compressor 138 can write image data to the burst buffer 146 at a rate of one (1) 16-bit byte per 700 ns, the burst buffer 146 can accumulate four (4) 16-bit bytes in 2800 ns. Using DMA type transfer, the four bytes can be transferred to the page buffer 168 in 600 ns. Accordingly, during the accumulation period, 2200 ns remain for another I/O device to access the image data bus 154.

The exemplary I/O devices discussed above, other than the IAC 148 and the IAD 222, have the following data transfer rates:

| CPU 160 | 400 ns/16-bit byte (at 10 MHz clock) |
| RF 196 | 400 ns/16-bit byte |
| DDC 208 | 300 ns/Refresh Cycle |

In view of the above-stated rates, it follows that either the IAC 148 or the IAD 22 as well as the CPU 160, the RF 196 and the DDC 208 can access the bus 154 at least once during the 2800 ns interval in which four bytes are being accumulated in the burst buffer 146.

For the above example, image bus utilization of the image data bus 154 can be calculated relative to the I/O device using the bus 154 with the least frequency. Of the above-mentioned I/O devices, the RF 196, having a refresh cycle of 300 ns every 15000 ns, requires the bus 154 with the least frequency, i.e. only 2% of the 15000 ns interval. The DDC 208 requests the bus once every 5000 ns (8% of the 15000 ns interval), and, for a worst case compression ratio of 1:1, either the IAC 148 or the IAD 222 requires a data transfer once every 2800 ns for 600 ns (8% of the 15000 ns interval). Accordingly, the CPU 160 can use the bus as much as 68.57% of the 15000 ns interval. For higher compression rates, which in the preferred embodiment can be as high as 30:1, even more bus access time is made available for either the CPU 160, the RF 196 and the DDC 208. It will be appreciated by those skilled in the art that the relatively high utilization scheme described above permits for advantageous operation of the printing apparatus 10 in that multiple functions, such as data transfer, data manipulation and data storage, can all be performed in a time interval that, at least to the user, seems extremely brief.

Figure 11:
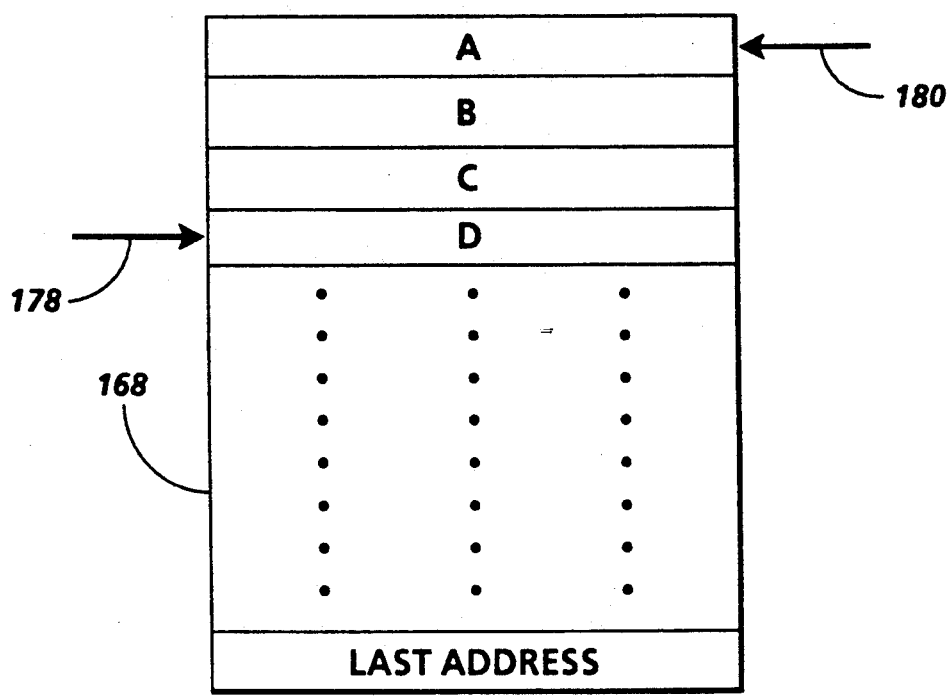
FIG. 11 is a schematic representation demonstrating how two address counters can be used as a dual pointing arrangement for the page buffer.
Figure 12:
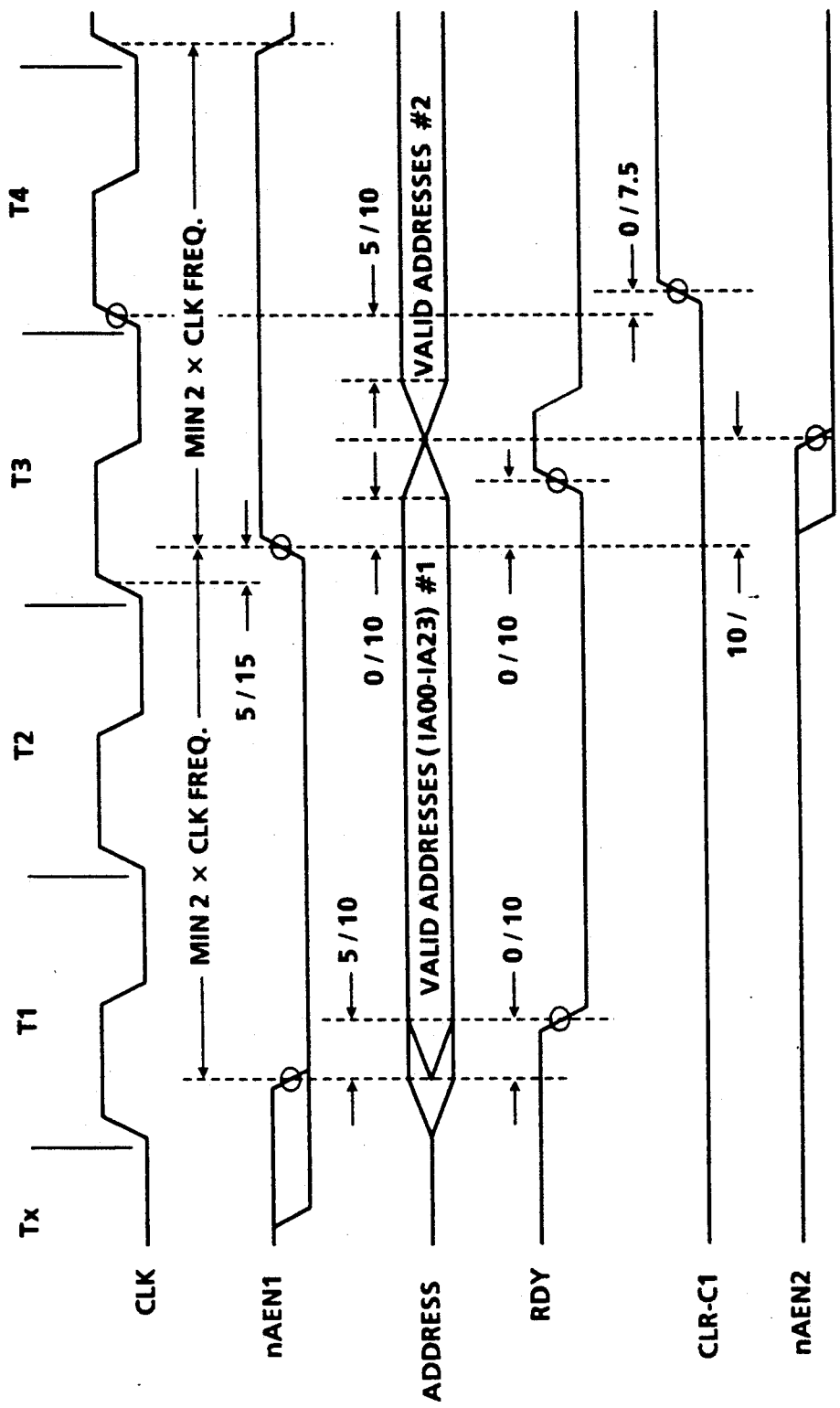
FIG. 12 is a timing diagram demonstrating the use of the dual pointing arrangement of FIG. 11.

Referring to FIGS. 5 and 11–12, features of the MAR 156, that are believed to significantly enhance data transfer operations, are discussed in further detail. In particular, each of counters or pointers 178, 180 (FIG. 5) function as "loop-around pointers" whose movements are respectively limited by the pre-programmed comparators 180, 182. Accordingly, respective movement of each of the counters or pointers 178, 180 down the stack of the page buffer 168 is limited by the respective settings of the comparators 182, 184. Such limiting of the pointers 178, 180 is particularly suitable for those instances in which the user does not intend to overwrite certain data stored further down in the stack.

Another aspect of the dual pointer arrangement is that image data need not be written into and read out of the page buffer 168 with the same counter. In the illustrated example of FIG. 11, four bytes of image data have been written into the page buffer 168 from the IAC 148 so that the pointer 178 has been moved from the first address "A" to the fourth address "D." If only pointer 178 were available, the image data would be read out of the page buffer 168 by looping the pointer 178 back to address A. With the concept disclosed by the present invention, however, the data at the addresses A-D can be read out using the second pointer 180. As will be appreciated by those skilled in the art, each of pointers 178, 180 can be used to designate an address for use in any suitable page buffer operation.

Referring to FIG. 12, a "snapshot" of the pointing arrangement in FIG. 11 is shown. During a first interval the address D can be designated for a data transfer operation with a first I/O device by causing the enabling signal nAEN1 to go low. Subsequently, the address at A can be designated for a data transfer operation with a second I/O device by causing the enabling signal nAEN2 to go low. In one example, the first I/O device could be the IAC 148 with image data being written into the page buffer 168, and the second I/O device could be the IAD 224 with data being read out to the IOT interface 46. In other contemplated examples the I/O devices could be various combinations of the IAC 148, the CPU 160, the RF 196, the DDC 208, the IAD 222 or any like I/O device that could be coupled with the page buffer 168.

What is claimed is:

1. In a printing apparatus with a video processor adapted to transfer a first set of image data from an input device to an output device, said video processor including a controller for controlling operation of the input device and the output device as well as said video processor, said video processor having a first bus across which the first set of image data is transmitted, said video processor comprising:
    an input buffer, communicating with the first bus and the input device, for buffering the first set of image data;
    a page buffer, communicating with the first bus and said input buffer, for selectively storing the first set of image data, said page buffer including predesignated addresses at which the first set of image data is stored,
    a second bus being coupled with the controller and said page buffer; and
    a programmable direct memory access apparatus being coupled with said input buffer, said page buffer and the controller, said programmable direct memory access apparatus being decoupled relative to said second bus and programmed with the controller for enabling transfer of the first set of image data from said input buffer to the predesignated addresses, wherein during a first time interval, the first set of image data is buffered in said input buffer while the controller communicates with said page buffer to transfer a set of data with said page buffer, and during a second time interval, the first set of image data is transferred to the predesignated addresses of said page buffer, with said programmable direct memory access apparatus, while the controller is using of the second bus.

2. The printing apparatus of claim 1, further comprising a data source, communicating with said second bus, for transmitting a second set of image data to said page buffer while the first set of image data is being buffered in said input buffer.

3. The printing apparatus of claim 1, wherein:
    the input device is a scanner adapted to generate the first set of image data; and
    the output device comprises a raster output scanning device responsive to the first set of image data.

4. The printing apparatus of claim 3, further comprising:
    a charge retentive member;
    means, disposed adjacent said charge retentive member, for charging said charge retentive member, said raster output scanning device being adapted to selectively discharge a surface of said charge retentive member to form an intelligible pattern of charged and discharged areas on said charge retentive member;
    means, disposed adjacent said charge retentive member, for developing the intelligible pattern on said charge retentive member to form a developed pattern thereon; and
    means, disposed adjacent said charge retentive member, for transferring the developed pattern from said charge retentive member to a substrate.

5. The printing apparatus of claim 1, wherein:
    said page buffer comprises dynamic random access memory; and
    the controller includes refreshing means for periodically refreshing said dynamic random access memory.

6. The printing apparatus of claim 1, wherein said input buffer comprises a "first in-first out" buffer.

7. The printing apparatus of claim 1, further comprising means for compressing the first set of image data by a preselected compression ratio, said compressing means being coupled with said input buffer to form an integrated compressor.

8. The printing apparatus of claim 1, further comprising an output buffer, communicating with said page buffer, for buffering the first set of image data when the first set of image data is transmitted from said page buffer to said output buffer.

9. The printing apparatus of claim 8, wherein said output buffer includes a "first-in, first-out" buffer.

10. The printing apparatus of claim 9, further comprising means for decompressing the first set of image data transmitted from said page buffer by a preselected decompression ratio, said decompressing means being coupled with said output buffer to form an integrated decompressor.

11. The printing apparatus of claim 1, in which the predesignated addresses are in a sequence and the first set of image data comprises a plurality of bytes, wherein:
    said programmable direct memory access apparatus includes first counting means, communicating with said page buffer, for counting through the sequence of addresses; and
    each of the plurality of bytes is inserted into a respective address of the sequence of addresses as the respective address is counted by said first counting means.

12. The printing apparatus of claim 11, wherein said first counting means comprises:
   an address counter; and
   means, coupled with said address counter, for determining when the count has reached a preselected address within the sequence of addresses.

13. The printing apparatus of claim 12, wherein said first counting means further comprises means for resetting said address counter when the count has reached the preselected address.

14. The printing apparatus of claim 11, further comprising second counting means, communicating with said page buffer, for counting through the sequence of addresses, wherein the sequence of addresses can be counted by a selected one of said first counting means and said second counting means.

15. The printing apparatus of claim 1, wherein said programmable direct memory access apparatus includes a control logic circuit and a register, wherein said control logic circuit communicates with said input buffer while said register communicates with said controller and said page buffer.

16. In a printing apparatus with a video processor adapted to transfer a set of image data from an input device to an output device, said video processor including a controller for controlling operation of the input device and the output device as well as said video processor, said video processor having an image bus across which the set of image data is transmitted, said video processor comprising:
   an input buffer, communicating with the image bus and the input device, for buffering the set of image data;
   a page buffer, communicating with the image bus and said input buffer, for selectively storing the set of image data, said page buffer including selected locations at which the set of image data is stored, the controller communicating with said page buffer;
   a programmable direct memory access apparatus being coupled with said input buffer, said page buffer and the controller, said programmable direct memory access apparatus being programmed with the controller for enabling transfer of the set of image data from said input buffer to the selected locations; and
   a second image bus, serving as a direct link between the input device and the output device, so that a copy of the set of image data is transmitted, across said second image bus, directly to the output device concurrent with the set of image data being transmitted to said input buffer.

* * * * *